United States Patent
Bendall

[11] 3,756,674
[45] Sept. 4, 1973

[54] BEARINGS
[76] Inventor: Wilfrid H. Bendall, 19 N. Broad St., Pawcatuck, Conn. 02891
[22] Filed: Mar. 29, 1972
[21] Appl. No.: 239,210

[52] U.S. Cl. ............................................. 308/121
[51] Int. Cl. ...................... F16c 13/02, F16c 33/66
[58] Field of Search ................... 308/73, 121, 122, 308/240

[56] References Cited
UNITED STATES PATENTS
3,655,249   4/1972   Abel ................................ 308/121

Primary Examiner—Charles J. Myhre
Assistant Examiner—Frank Susko

[57] ABSTRACT

Concentric sliding bearing members have axial and annular grooves arranged to provide compliant load-bearing portions and sealed lubricant storage capacity. The construction confines and limits lubricant flow to the amount required to maintain a load-supporting film at the bearing contacts. The disclosure illustrates sealed radial, thrust and self-aligning bearing embodiments of the invention.

10 Claims, 6 Drawing Figures

PATENTED SEP 4 1973

3,756,674

3,756,674

BEARINGS

BACKGROUND OF THE INVENTION

The present invention relates to improvements in journal bearings embodying elastohydrodynamic sliding bearing operating principles and more particularly their application to preadjusted, prelubricated and sealed bearing units. Such bearing units have been proposed in the art but apparently are not in commercial use or availability. It is continually observed, however, thst sliding fluid film bearings, in principle and as compared with rolling element bearings, potentially offer the advantages of simpler manufacture, high capacity, quiet operation, unlimited fatigue life, negligible maintenance and lower cost. The practical realization of these desirable performance criteria depends largely on the character and arrangement of the bearing contact areas and on provision of a continuous lubricating film at such areas without generating destructive internal temperatures owing to fluid friction and viscous shear of the lubricant. This is especially problematical with grease and semi-fluid lubricants which are otherwise preferable as simplifying sealed bearing closure requirements and for protection of the bearing interior against the entrance of contaminants.

SUMMARY OF THE INVENTION

The broad object of the present invention may be inferred from the foregoing description of the advantages and problems involved in producing bearings of the type described. Other, specific, objects are to provide such a bearing with elastohydrodynamic contacts in a form convenient and economical to manufacture; to provide a bearing of this type with integral, structurally compliant bearing portions better adapted to utilize hydrodynamic bearing principles; also, a bearing industrially applicable as a preadjusted, lubricated and sealed unit adapted for extended, maintenance-free operation by provision of a relatively large integral lubricant storage capacity; a bearing of the type described particularly adapted to use lubricants of high viscosity without generating excessive internal friction and viscous shear losses - accordingly, a bearing arranged to confine lubricant flow to a rate and volume required to constitute a load-bearing film only at the contact areas; such a bearing in which all other parts of the contained lubricant volume are free from rubbing and shearing contacts and are conveyed in relatively inert motion circumferentially synchronous with the rotating bearing element; such a bearing, again, economically adapted to construction and operation with contact areas of radial, conical or spherical form, as desired.

All of the foregoing and other objects of the present invention, and the advantages of bearings constructed in accordance therewith, follow reference to the accompanying drawings, wherein.

DESCRIPTION OF THE PREFERRED EMBODIMENTS

Figure 1:
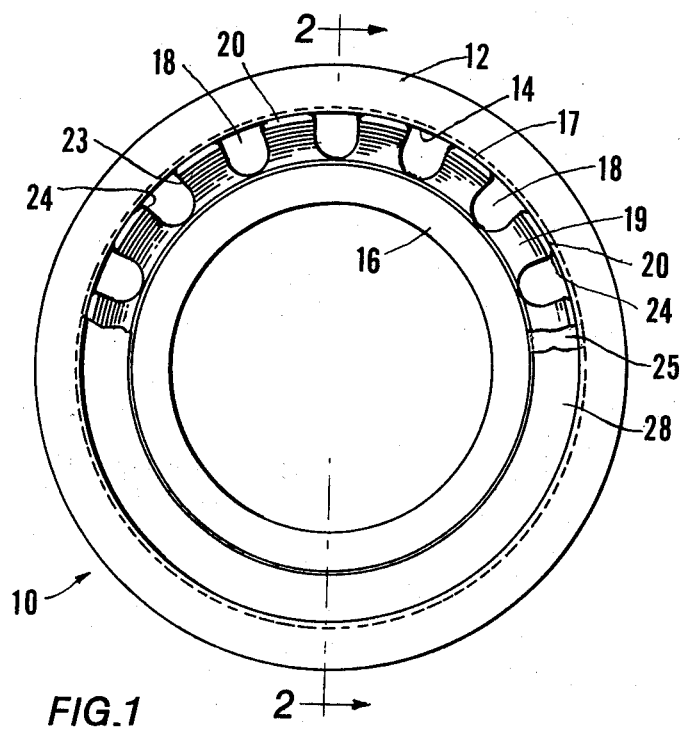
FIG. 1 is a partly sectioned side elevational view of a journal bearing of the present invention.
Figure 2:
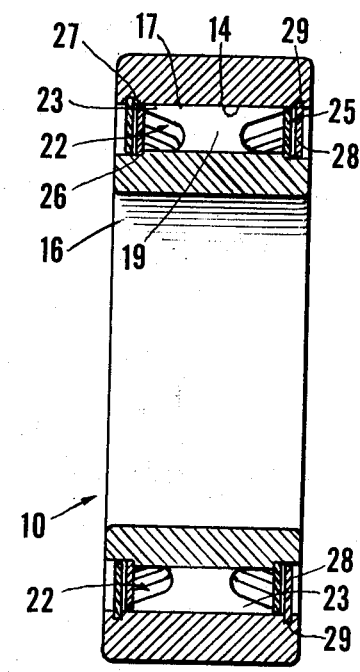
FIG. 2 is a sectional view taken on the line 2—2 of FIG. 1.

With reference to FIGS. 1 and 2, a journal bearing embodying the present invention is generally designated by the numeral 10 and comprises the outer ring 12 having a cylindrical inner bearing surface 14 and the inner ring 16 having an axially grooved bearing surface 17 contiguous with the bearing surface 14.

In the present instance the bearing surface 17 is formed with a plurality of axially extending and circumferentially spaced grooves 18 alternating with axially and radially extending bearing portions each comprising a structurally compliant strut 19 subtending a bearing surface 20. The grooves 18 extend axially to annular grooves 22 at each end of the inner ring 16 and the bearing portions 19 are thus further subtended by the annular grooves to effect compliant tapered end portions 23 thereof. The tapered end portions further serve to relieve concentrated end loads caused by unavoidable deviations from axial alignment.

It will be observed that this arrangement of the inner ring member 16 constitutes a compliant multiple-land bearing structure adapted to entrain a plurality of elastohydrodynamic load-supporting films between the contiguous bearing surfaces at the instant of relative rotation. This load-film generating action is further ensured by the slight rounding of the axially extending edge portions 24 of the inner ring bearing surfaces, the circumferentially short lands obviating the need for the relatively long convergent fluid entrainment portions required for full circle hydrodynamic bearings.

The totality of interconnected axial and annular grooves of the inner ring member constitute an internal reservoir of substantial volume for retention of a lubricating medium. Such retention is further ensured by annular end closure ring members 25 which are mounted on and secured to the bearing ring at their inner edge contact 26 and are in close running clearance at their outer circumference 27 proximate to inner surface 14. Supplementary enclosure and retention of the bearing assembly is effected by external resilient closure members 28, sprung into annular grooves 29 in the outer member and in axially spaced running clearance with the inner closure members.

Visualizing the bearing assembly enclosed as described immediately above, and assuming the axial and annular grooves to be filled with a suitable lubricant, it will be seen that lubrication of the bearing is effected by an essentially inert translation of the lubricant channelled in the grooves and between end closures 25. Such translation of the lubricant is accomplished without relative internal movement other than a slow circulation generated by laminar shear at the fluid contact with the inner surface areas between each bearing portion 19. During rotation the lubricant is under continuous centrifugal pressure against the inner surface 14 and is thus continuously available for wedged entrainment at the bearing contacts, the amount thus entrained being limited to that required to establish a load-bearing film therebetween. The lubricant flow is thus reduced to an absolute minimum. This feature of the bearing of this invention emphasizes its avoidance of the performance-limiting rubbing contacts and high velocity viscous shear of the lubricant involved in many fluid lubricated bearings.

Figure 3:
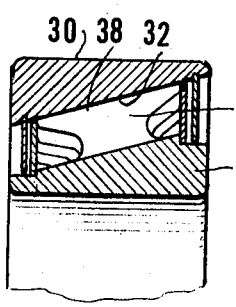
FIG. 3 is a fragmentary sectional view of a modification of the journal bearing of this invention comprising conical bearing surfaces.

Referring to the modification of the bearing of this invention disclosed in FIG. 3, the outer ring 30 is provided with an internally conical bearing surface 32 and the inner ring 34 with the characteristic axially and annularly grooved bearing portions 36 having conical bearing contact surfaces 38 contiguous with surface 32 for rotation relative thereto. This modification adapts it for combined high axial and radial loads. In all other respects its operating principle and general arrangement are substantially as described for the embodiment disclosed above.

Figure 4:
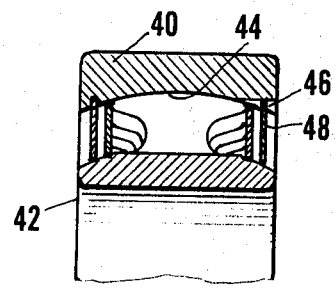
FIG. 4 is a fragmentary sectional view of a further modification of the bearing of this invention comprising spherical bearing surfaces.

The further modification of the bearing of this invention disclosed in FIG. 4 comprises an outer ring 40 and inner ring 42 having contiguous spherical bearing surfaces 44, and thus with ability to absorb misalignment of journals and housings without reduction of the bearing radial and thrust load capacity. The inner ring 42 is otherwise identical in grooving, operating principle, lubricating and sealing arrangements with the foregoing embodiments. The method of assembly of this bearing may utilize an assembly notch 46 and a resilient outer closure member 48 of sufficient radial depth to seal the notch.

Figure 5:
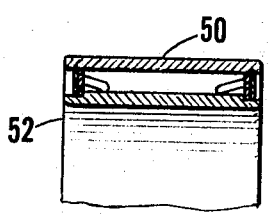
FIG. 5 is a fragmentary sectional view of a modification of the bearing of this invention showing its adaptation to a lightweight thin-sectioned configuration.

The modification shown in FIG. 5 illustrates the adaptability of the bearing of this invention to fabrication with relatively light-sectioned outer ring members 50 and inner ring members 52. This bearing is otherwise identical in form and operating principle with the earlier disclosed bearing constructions. Light-sectioned assemblies of this form adapt the design for numerous industrial and automotive requirements for compact, light load, integrally lubricated and sealed bearing units.

Figure 6:
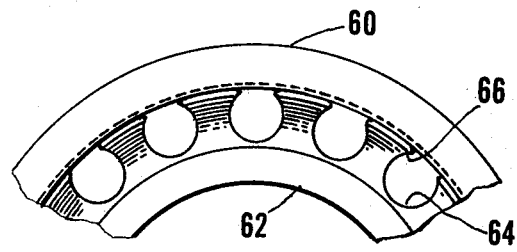
FIG. 6 is a fragmentary side elevational view of a modified form of inner member of the bearing of this invention.

The modification disclosed in FIG. 6 illustrates the bearing of this invention with the typical outer ring 60 and a modified inner ring member 62 characterized by circular section grooves 64 enabling increased compliance of the bearing edge portions 66 in response to lubrication entrainment. In all other respects the construction and operating principle follow that enumerated for the earlier described and illustrated embodiments.

It is to be understood that while the outer ring member in each of the embodiments described in the foregoing is illustrated as a separate member, it may alternatively comprise an integral part of a machine housing or the like for reception of inner members of the form described herein. The inner ring members likewise may comprise an integral part of a drive shaft, these and other such modifications of this invention being properly within the scope of the following claims:

What is claimed is:

1. A bearing comprising concentric inner and outer ring members having contiguous sliding bearing surfaces, one of the members being arranged for rotation relative to the other, the bearing surface in rotation having alternating, axially disposed bearing portions and grooves extending to annularly grooved end portions, each of said bearing portions comprising a compliant, radially extending strut subtending a bearing surface and being further subtended by the annular grooves to comprise radially compliant end portions, said bearing surfaces being shaped and arranged to entrain a load-bearing lubricating film, the totality of said grooves comprising an interconnected reservoir of substantial internal volume for relatively inert translation of a lubricant to the bearing surfaces, a lubricant in the grooves, said lubricant being under centrifugally induced pressure, said bearing ring members having annular end closure members and the ring member in rotation having closure members mounted thereon enclosing the lubricant in the grooves and excluding it from viscous frictional contact with closure members of the other ring member.

2. The bearing of claim 1 wherein said contiguous bearing surfaces are parallel.

3. The bearing of claim 1 wherein said contiguous bearing surfaces are conical.

4. The bearing of claim 1 wherein said contiguous bearing surfaces are spherical.

5. The bearing of claim 1 wherein said radially compliant bearing portions have tapered ends.

6. The bearing of claim 1 in which said axially disposed grooves are circular in form whereby said bearing portions have compliant, axially extending edge portions.

7. The bearing of claim 1 further comprising interfitted annular end sealing members for enclosure and retention of a lubricant.

8. The bearing of claim 1 wherein the relative movement of said lubricant is restricted to the amount entrained between the bearing surfaces.

9. The bearing of claim 1 wherein said centrifugal pressure of the lubricant is substantially directed toward said bearing surfaces.

10. The bearing of claim 1 wherein the lubricating requirement is limited to that of said contiguous bearing surfaces.

* * * * *